US008530048B2

(12) United States Patent
Nolte et al.

(10) Patent No.: US 8,530,048 B2
(45) Date of Patent: Sep. 10, 2013

(54) SURFACE-MODIFIED PARTICLES AND PRODUCTION METHOD

(75) Inventors: Ulrich Nolte, Kleve (DE); Alfred Bubat, Wesel (DE); Karlheinz Haubennestel, Wesel (DE); Thomas Sawitowski, Essen (DE)

(73) Assignee: Byk-Chemie GmbH, Wesel (DE)

( * ) Notice: Subject to any disclaimer, the term of this patent is extended or adjusted under 35 U.S.C. 154(b) by 744 days.

(21) Appl. No.: 12/376,519

(22) PCT Filed: Jul. 16, 2007

(86) PCT No.: PCT/EP2007/006273
§ 371 (c)(1),
(2), (4) Date: Apr. 29, 2009

(87) PCT Pub. No.: WO2008/017364
PCT Pub. Date: Feb. 14, 2008

(65) Prior Publication Data
US 2010/0048809 A1 Feb. 25, 2010

(30) Foreign Application Priority Data

Aug. 6, 2006 (DE) .......... 10 2006 036 950
Aug. 7, 2006 (DE) .......... 10 2006 037 106
Aug. 10, 2006 (DE) .......... 10 2006 037 596

(51) Int. Cl.
*B32B 5/16* (2006.01)
*B32B 1/00* (2006.01)
*B05D 7/00* (2006.01)

(52) U.S. Cl.
USPC .......... 428/403; 427/212; 427/215; 427/220; 428/405

(58) Field of Classification Search
None
See application file for complete search history.

(56) References Cited

U.S. PATENT DOCUMENTS

| 4,061,503 | A | * | 12/1977 | Berger et al. ............... 106/445 |
| 4,715,986 | A | * | 12/1987 | Gruning et al. ............. 516/100 |
| 5,182,173 | A | * | 1/1993 | Swei ........................ 428/391 |
| 5,665,155 | A | * | 9/1997 | Hohner et al. ............ 106/287.14 |
| 5,686,054 | A | | 11/1997 | Barthel et al. ............. 423/335 |
| 5,851,715 | A | | 12/1998 | Barthel et al. ............. 430/110 |
| 6,887,518 | B2 | | 5/2005 | Barthel et al. ............. 427/219 |
| 7,504,469 | B2 | | 3/2009 | Haubennestel et al. ..... 528/25 |
| 2004/0071956 | A1 | * | 4/2004 | Tsuji et al. ............... 428/328 |
| 2006/0204528 | A1 | | 9/2006 | Nolte et al. ............... 424/401 |
| 2006/0216259 | A1 | * | 9/2006 | Haubennestel et al. ... 424/70.12 |

FOREIGN PATENT DOCUMENTS

| EP | 0 686 676 A1 | 12/1995 |
| EP | 1 304 361 A1 | 4/2003 |
| EP | 1 614 705 A1 | 1/2006 |
| EP | 1 690 884 A1 | 8/2006 |
| EP | 1 690 902 A2 | 8/2006 |

OTHER PUBLICATIONS

English translation of the Int'l Search Report from PCT/EP2007/006273, 10 pgs.

* cited by examiner

*Primary Examiner* — Mark Ruthkosky
*Assistant Examiner* — Alexandre Ferre
(74) *Attorney, Agent, or Firm* — Brannon Sowers & Cracraft P.C.

(57) ABSTRACT

The invention relates to surface-modified particles, more particularly inorganic-based particles having reactive surfaces, more particularly surfaces containing silane-reactive and/or siloxane-reactive groups, preferably hydroxyl-containing surfaces and/or particles comprising or consisting of metal and/or semi-metal oxides and/or hydroxides, preferably nanoparticles, which on their surface have a polysiloxane-based modifier having more particularly been reacted on their surface with a polysiloxane-based modifier, preferably with the formation of chemical bonds, more particularly covalent bonds, and also to a method of producing these surface-modified particles.

16 Claims, No Drawings

SURFACE-MODIFIED PARTICLES AND PRODUCTION METHOD

CROSS REFERENCES TO RELATED APPLICATIONS

This application is a National Stage filing of International Application PCT/EP2007/006273, filed Jul. 16, 2007, claiming priority to German Application Nos. DE 10 2006 036 950.5, filed Aug. 6, 2006; DE 10 2006 037 106.2, filed Aug. 7, 2006; and DE 10 2006 037 596.3, filed Aug. 10, 2006, all of which are expressly incorporated by reference herein, in their entirety.

BACKGROUND OF THE INVENTION

The present invention relates to surface-modified particles, in particular inorganic-based particles, having reactive surfaces, in particular silane-reactive or siloxane-reactive surfaces, in particular hydroxyl-containing surfaces and/or particles consisting of or comprising metal or semi-metal oxides and/or hydroxides, preferably nanoparticles, which on their surface have a polysiloxane-based modifier, in particular having been reacted on their surface with a polysiloxane-based modifier, preferably with the formation of chemical, in particular covalent, bonds as well as a corresponding method for producing these surface-modified particles.

In addition the present invention relates to the use of these surface-modified particles, in particular in coating materials, and coating systems, in particular paints, colorants and the like, in dispersions of all types, in plastics, in foams, in cosmetics, in particular nail varnishes, in adhesives, in sealants, etc. Moreover, the present invention relates to the use of these surface-modified particles as fillers, in particular in the aforementioned systems.

In addition the present invention relates equally to systems, in particular coating materials and coating systems, in particular paints, colors and the like, plastics, foams and cosmetics, in particular nail varnishes, which contain these surface-modified particles. Finally, the subject matter of the present invention is also new dispersions which contain these surface-modified particles in a carrier or dispersant medium.

The use of particles, in particular nanoparticles, in coating and dispersion systems are fundamentally known to the skilled person from the prior art: thus, the use of nanoparticles as fillers for coating systems offers the advantage that a coating material obtains desired properties (e.g. increased scratch resistance) without adverse effects having to be taken into account at the same time (e.g. poor transparency).

It is known that the incorporation of nanoparticles into coating systems leads, for example, to the improvement in the mechanical properties of coating systems, for example in UV-curable coating systems.

Thus, for example, a method for the modification of nanoscale silica particles with alkoxysilanes which after incorporation into a corresponding UV-curable coating system provides an improvement in mechanical properties is described in EP 1 236 765 A1. Positive effects have also been found in other high-grade cross-linked systems such as, for example, in epoxide resins. The improvement in the mechanical properties is effectively explained by the binding of the nanoparticles to the surrounding matrix by means of chemical bonds. Owing to the chemical bonding of the particles to the organic matrix increasing embrittlement is observed, depending on the filler content of the coating material with such nanoparticles, and which depending on the field of application is detrimental for the coating. If the known silica-based nanoscale fillers are not bound to the organic matrix the desired effect of the improvement in the mechanical properties of UV-curable or epoxide-based coating systems is far less pronounced.

In addition to silica nanoparticles other types of nanoparticles may also be incorporated into coating materials in order to optimize their mechanical properties. For example, by addition of nanoscale aluminum oxide (e.g. the commercial products NANOBYK-3600 and NANOBYK-3601 of BYK-Chemie GmbH, Wesel, Germany) to UV-curable coating systems a clear improvement in abrasion resistance is achieved without effecting the flexibility of the system. In this case the aluminum oxide is not bound to the organic matrix of the coating system. The stabilization of the nanoparticles in the paint matrix is carried out with commercial wetting and dispersion additives.

Coating systems that are not UV-curable or are based on epoxide systems can likewise be optimized in respect of the scratch-resistance by the addition of nanoparticles.

Thus a method is described in U.S. Pat. No. 6,593,417 A in which silica particles in combination with a polysiloxane are used in a two-component polyurethane paint. The polysiloxane possesses reactive groups which can bind with the paint matrix through covalent groups. The bonding of the polysiloxane to the nanoparticles occurs merely by coordinative interactions. The specific combination of nanoparticles and polysiloxane effects orientation of the nanoparticles to the coating/air interface and leads to mechanical strengthening there, which is demonstrated by an increased scratch resistance. The orientation of the nanoparticles to the coating/air interface is disadvantageous since through stress on the coating through weathering and wear the uppermost layer is first removed and therefore the activity decreases with time.

U.S. Pat. No. 5,853,809 A teaches that an improvement in scratch resistance of coating systems that are used, for example, in automobile coating paints, can be achieved by the incorporation of modified nanoparticles. The modification of the nanoparticles is carried out, for example, with a functional polyurethane such that the polymer forms a covalent bond with the nanoparticle surface. Moreover, the polymeric shell of the nanoparticle modified in this way is able to participate in covalent bonds with the binding agent system of the coating material. Statements on the embrittlement of the paint system, especially at high nanoparticle contents, have not been made.

The modified nanoparticles from the prior art do indeed improve the scratch resistance of the paint in which they are used; but in particular with non-radiation-cured, in particular UV-crosslinked, systems the bonding of the nanoparticle by modification onto the paint matrix is particularly open to criticism: through the bonding of the nanoparticles to the paint matrix the network density of the cured paint film is increased, which leads to increased embrittlement of the paint film.

Nanoscale filler particles which are dispersed in a polymer matrix are known from DE 195 40 623 A1. Silanes, in particular organoalkoxysilanes, are described amongst others as surface modifiers. The surface modifiers are low-molecular weight compounds with a molecular weight that is not greater than 500 Dalton. The functional groups which such compounds must carry are determined by the surface groups of the nanoscale particles and the desired interaction with the matrix. The modified particles thus show an affinity for the matrix.

Thus the object on which the present invention is based is thus to provide surface-modified particles, in particular nanoscale surface-modified particles, which are in particular suitable for use in the afore mentioned systems and which at least essentially avoid or at least mitigate the disadvantages associated with the conventional particles as well as a corresponding method of production for such particles.

A further object of the present invention is seen in providing a new, efficient surface modification of particles of the type mentioned at the outset, in particular nanoparticles.

Furthermore, the object on which the present invention is based is to provide the particles, in particular nanoparticles, as stable dispersions in suitable dispersants and carriers (e.g. solvents, water, etc.) as they are used, for example in the surface coating industry. These new dispersions should have high storage stability even at high particle content. The tendency of these particle dispersions, in particular nanoparticle dispersions towards sedimentation or gel formation should be advantageously excluded. Moreover, the dispersions, in particular if they are used for the production of coating materials, should advantageously also bring about inter alia an increase in the scratch resistance of the cured coating. Any reactivity of the new surface-modified particles, in particular nanoparticles, towards the system in which they are used, in particular towards the binding agent component of the paint system, should be minimized as far as possible, preferably in order to avoid the tendency of the cured paint film towards embrittlement. In particular the surface modification must be as inert as possible or of as low reactivity as possible towards systems in which the surface-modified particles are used, in particular towards a paint matrix.

Finally a further object of the present invention is the provision of a production method for the new surface-modified particles, in particular nanoparticles, which can be carried out in a simple manner and can be varied widely, in particular in order to in this way tailor make new surface-modified particles, in particular nanoparticles, and their dispersions for different applications.

The applicant has now surprisingly found that the aforementioned object can be achieved in an efficient manner if particles, in particular inorganic-based particles with reactive groups, preferably silane- or siloxane-reactive groups, in particular hydroxyl groups on their surface and/or particles comprising or consisting of metal and/or semi-metal oxides, hydroxides and/or oxide hydroxide, preferably nanoparticles, are reacted with a polysiloxane-based modifier, preferably with the formation of chemical, preferably covalent, bonds, which have a higher molecular weight, preferably linear in structure, is inactive towards a surrounding matrix and is equipped with modifying, in particular polar groups. In this way the dispersibility of the particles is improved in a surprising manner, the surface modification improved over known systems, and the polarities better controlled.

To achieve the aforementioned object the present invention proposes surface modified particles according to the present disclosure. Further advantageous properties are described hereinafter.

Further subject matter of the present invention is a method for the production of the surface-modified particles of the invention according to the disclosure. Further advantageous properties are described.

Again, a further subject matter of the present invention is the use of the surface-modified particles of the invention as fillers according to the disclosure.

A further subject matter of the present invention is the use of the surface-modified particles of the invention as coating materials and coating systems, in particular paints, colorants and the like, in dispersions of all types, in plastics, in foams, in cosmetics, in particular nail varnish, in adhesives and in sealants according to the present disclosure.

Furthermore, subject matter of the present invention are likewise dispersions which contain the surface-modified particles of the invention in a carrier or dispersion medium according to the disclosure.

Finally a further subject matter of the present invention are coating materials and coating systems, in particular paints, colorants and the like, plastics, foams, cosmetics, in particular nail varnish, adhesives and sealants which contain the surface-modified particles of the invention according to the disclosure.

The present invention is described in detail on the basis of the surface-modified particles of the invention, in particular nanoparticles. The embodiments to this effect apply accordingly to the other aspects and subject matters of the present invention—production method of the invention, use of the invention, dispersions of the invention, etc—so that to avoid unnecessary repetition reference can be made hereunto also for the other aspects and subject matters of the present invention.

BRIEF SUMMARY

The invention relates to surface-modified particles, more particularly inorganic-based particles having reactive surfaces, more particularly surfaces containing silane-reactive and/or siloxane-reactive groups, preferably hydroxyl-containing surfaces and/or particles comprising or consisting of metal and/or semi-metal oxides and/or hydroxides, preferably nanoparticles, which on their surface have a polysiloxane-based modifier having more particularly been reacted on their surface with a polysiloxane-based modifier, preferably with the formation of chemical bonds, more particularly covalent bonds, and also to a method of producing these surface-modified particles.

One object of the present disclosure is to describe an improved method for producing surface-modified particles.

DETAILED DESCRIPTION

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Subject matter of the present invention—according to a first aspect of the present invention—is thus surface-modified particles, in particular inorganic-based particles with reactive, preferably silane-reactive or siloxane-reactive groups, in particular with hydroxyl groups, on their surface and/or particles, preferably nanoparticles, consisting of or comprising metal and/or semi-metal oxides, hydroxides and/or oxide hydroxides, preferably nanoparticles, whereby the particles have a polysiloxane-based modifier on their surface, in particular have been reacted on their surface with a polysiloxane-based modifier, preferably with formation of chemical, in particular covalent, bonds, whereby the surface-modified particles are characterized in that the modifier is a polysiloxane with the following general general formula

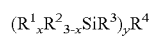

whereby in the general formula
  x=0 to 2 including the limits, in particular x=0;
  y=1 to 10 including the limits, in particular y=2 to 5;
  $R^1$=a monovalent organic radical, preferably with 1 to 18 carbon atoms, in particular 1 to 10 carbon atoms, especially 1 to 3 carbon atoms;
  $R^2$=OH group or hydrolysable group comprising or consisting of:
    a linear or branched or cyclic alkoxy group with 1 to 6 carbon atoms, in particular 1 to 2 carbon atoms,
    a halogen atom, in particular a chlorine atom or
    a carboxylic acid radical with 1 to 4 carbon atoms, in particular 2 carbon atoms;
  $R^3$=oxygen or at least divalent organic radical comprising or consisting of:
    a linear or branched, preferably linear alkylene radical, in particular with 1 to 8 carbon atoms,
    an alkylene ether,
    an alkylene thioether,
    an alkylene polyether, preferably based on ethylene oxide, propylene oxide, butylene oxide or styrene oxide or mixtures of the oxides or based on a statistic or block polyether,
    an arylene polyether,
    an alkylene polyester or
    an organic aliphatic or aromatic or arylaliphatic group, in particular whereby the group also contains urethane and/or urea groups in addition to ester and/or ether groups;
  $R^4$=mono- or polyvalent radical comprising or consisting of a polydialkylsiloxane with 4 to 200 Si units and with $C_1$-$C_{18}$ alkyl groups on the silicon atoms, whereby the $C_1$-$C_{18}$ alkyl groups are partially and in each case independently of one another replaced or substituted by one or more of the following modifying groups (G), preferably polar modifying groups (G) (i.e. in other words are exchanged by these groups, in particular by grafting), selected from the following modifying groups (G1) to (G4) listed under (i) to (iv):
    (i) group (G1) containing (poly)ether groups, in particular based on at least one alkylene oxide,
    (ii) group (G2) containing polyester groups,
    (iii) group (G3) containing arylalkyl groups,
    (iv) group (G4) containing perfluorinated alkyl groups.

Advantageous embodiments of the present invention are described hereinafter.

A decisive feature of the present invention must be seen in the preferably polar modification of the Group $R^4$: as explained before, the alkyl groups of the polydialkylsiloxane radical (i.e. the $C_1$-$C_{18}$ alkyl groups on the silicon atom) are partially and independently of one another exchanged or replaced by a modifying, preferably polar group (G) (e.g. by grafting). Surprisingly, in this way, the dispersibility of the particles of the invention are on the one hand improved. On the other hand, the polarity can be targetedly controlled in this way so that in this way the application properties can also be tailor-made. Finally in this way the surface modification can be pivotally improved, in particular in respect of the desired application properties (e.g. scratch resistance of paints, etc.). The modifying group (G) for the group $R^4$ are selected in such a way that in respect the application systems or application matrix and their contents (e.g. paint matrix) they are advantageously compatible, in particular inert or at most as poorly reactive as possible. The preferable polar modifying groups (G) are incorporated, for example, by grafting into the radical $R^4$ (e.g. by hydrosilylation or addition reaction or by condensation reaction) starting from commercially available starting materials; this is familiar as such to the skilled person and will also be described in more detail in the following.

In particular preferred embodiments in respect of the selection of the modifying groups (G) are described hereinafter.

A particular embodiment of the surface-modified particles of the invention is set forth below.

An exceptional increase in performance of the particles of the invention is achieved by additional surface modification with silanes in accordance with the subject matter of the disclosure.

The particle size of the particles of the invention, in particular nanoparticles, lies in the range of 0.1 to 1,000 nm, in particular 0.5 to 500 nm, preferably 1 to 350 nm, more preferably 2 to 200 nm, most preferably below 100 nm, especially preferably below 50 nm. According to the invention the particle sizes can be determined by transmission electron microscopy.

According to the invention fine-particulate solids with a particle size in the aforementioned particle size range (i.e. in the range of 0.1 to 1,000 nm, in particular 0.5 to 500 nm, preferably 1 to 350 nm, more preferably 2 to 200 nm, most preferably below 100 nm, especially preferably below 50 nm) are known as nanoparticles. As previously mentioned, the determination of the particle size within the context of the present invention can be carried out in particular by transmission electron microscopy (TEM). A TEM investigation can be carried out to determine the particle size of the particles or nanoparticles of the invention: for this purpose the nanoparticle dispersions in question are usually diluted, transferred to a carbon griddle (in particular 600 mesh carbon film) and dried; the analysis is then carried out in each case with, for example, a LEO 912 transmission electron microscope. The evaluation of the TEM images is carried out, for example, digitally with software of the company analy-SIS Soft Imaging System GmbH. The particle diameters are generally calculated in each case for at least 1000 particles in which the measured area of the particles or nanoparticles are correlated with a circle of identical area. Finally the mean value is derived from the results.

The particles claimed, in particular nanoparticles, are generally inorganic particles on whose surface reactive, preferably silane-reactive or siloxane-reactive, groups in particular hydroxyl groups are located or arranged which are required for the chemical, preferably covalent, bonding of the modifying agent; i.e. the reactive groups located on the surface of the particles to be modified must be able to react with the modifier. In addition to hydroxyl groups, which according to the invention are preferred, other silane- and/or siloxane-reactive groups can also be considered, e.g. halogens (such as, for example, fluorine or chlorine) or groups having halogen atoms, etc.

In particular, the particles consist of or comprise at least one metal and/or semi-metal oxide, oxide hydroxide and/or hydroxide; mixtures or combination of different metal and/or semi-metal oxides, oxide hydroxides and/or hydroxides may be considered (e.g. particles comprised of mixed metal and/or semi-metal oxides, oxide hydroxides or hydroxides). For example, the oxides hydroxides and/or oxide hydroxides of aluminum, silicon, zinc and/or titanium, etc. may be used in the production of modified particles or nanoparticles. In addition, oxide hydroxides such as, for example, aluminum oxide hydroxide, may also be modified according to the described process. Equally suitable are other inorganic materials, in particular inorganic salts such as phosphates, sulfates, halides, carbonates, etc., optionally in admixture with the aforementioned metal and/or semi-metal oxides, oxide hydroxides and/or hydroxides. However, according to the invention metal and/or semi-metal oxides, oxide hydroxides and/or hydroxides of the aforementioned type are preferred.

The production process of the particles employed according to the invention, in particular of the oxidic, hydroxidic or oxide hydroxidic particles, in particular nanoparticles, can be carried out by the most varied of processes such as, for example, ion exchange processes, plasma processes, sol/gel processes, precipitation, comminution (e.g by milling) or flame hydrolysis, etc.; according to the invention it is irrelevant by which process the oxidic or hydroxidic particles are produced, i.e. according to the invention any particles of the aforementioned type produced may be surface-modified.

Within the context of the present invention the discovered, innovative surface-modified particles, in particular nanoparticles, are also referred to as particles of the invention or nanoparticles of the invention, respectively. Within the context of the invention the new dispersion of the particles or nanoparticles of the invention are also referred to as dispersions of the invention.

In the light of the prior art it was totally surprising and unforeseeable for the skilled person that the aforementioned objects forming the basis of the invention could be achieved by the particles of the invention, by the preparation of the invention, by the dispersions of the invention and the remaining aforementioned subject matter of the invention.

The production of the particles of the invention and the dispersions of the invention may be carried out in a simple manner without the involvement of inconvenient methods or processes.

The nanoparticles of the invention are suitable, for example, for the production of, for example, thermally curable, radiation-curable or 2-component coating systems, thermoplastics, foams, etc.

Through the provision of the dispersions of the invention success has been achieved in providing an easy-to-handle particle concentrate, in particular nanoparticle concentrate, which, for example, may be metered simply into a variety of coating systems in order to achieve the desired effect, for example an improved mechanical stability, e.g. scratch resistance.

As well as the simple metering of the dispersions of the invention high stability of the dispersions towards sedimentation and gel formation has been found, in particular at high solids content.

The particles of the invention, in particular nanoparticles, are advantageously covered by modifying groups in such a way that any functional reactive groups possibly still present on the particle surface are shielded such that for steric reasons a reaction of these groups with other functional groups can no longer take place.

The surface of the particles of the invention, in particular nanoparticles, are covered with at least one type of modifying group. The structure of the modifying groups is illustrated below:

The modifying group is bound chemically, preferably covalently, to the particle surface. The modifying group has different structural elements which can form in each case at least one chemical, in particular covalent, bond with the particle surface. In addition, the modifying group is composed of a spacer component which cannot participate in any reaction with the particle surface and is equally essentially inert towards the matrix (e.g. other coating components, plastic constituents, etc.). The spacer component of the modifying group can be formed, for instance, from a polymer with, for example, a number-average molecular weight in the range of 300 to 5,000 Dalton. The structure of the spacer radical is preferably linear.

This means that the modifier is constructed of at least one or several anchor groups reactive towards the particle surface as well as a polydialkylsiloxane (=component of the previously defined radical $R^4$). The anchor group with the linking structure can be attached to the ends of the polydialkylsiloxane or be present as side group on the polydialkylsiloxane.

The structure of the modifier employed according to the invention can be illustrated schematically by way of an example as follows, whereby in the illustrated example three different polar substituents or modifying groups (G) have been selected for the radical $R^4$ (=polydialkylsiloxane) in the diagram (reference can be made to the above definitions and to the patent claims in regard to the meaning of the substituents):

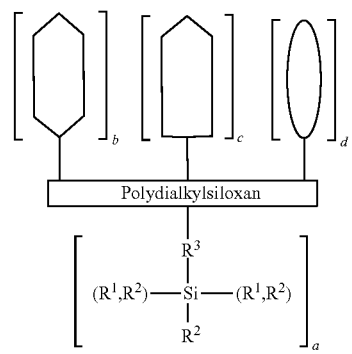

The index a describes the number of anchor groups, and the indices b, c, d . . . describe the number of preferably polar substituents or modifying groups (G) in the side group of the polydialkylsiloxane ($R^4$), whereby:

$a \geq 1$ $b+c+d+ \ldots \geq 1$

As described before, a surface modification of the particles can be carried out with silanes in accordance with claim 11 and/or 12, which in general are similarly bound to the particle surface through at least one chemical, in particular covalent, bond and advantageously have one or more spacer components. Reference is made to the claims for details in this respect.

The preparation of the nanoparticles of the invention can be carried out simply by mixing the modifier with a particulate, in particular nanoparticulate, powder. Care has to be taken that preferably a chemical, in particular covalent, bonding of the modifier to the surface of the nanoparticles takes place. The conditions for this are guided by the reactivity of the functional groups to be reacted with one another and can be determined easily by the skilled person. If a reaction does not already take place at room temperature a chemical, in particular covalent, bond of the modifier can be achieved by heating the mixture of nanoparticulate powder and modifier at a temperature of ca. 80° C. for a period of approx. one hour.

The preparation of the modifier employed according to the invention is familiar to the skilled person and can be achieved for example as follows:

Starting from commercially available open-chain and cyclic polydimethylsiloxanes and Si—H-functional polydimethylsiloxanes, Si—H-functional polydimethylsiloxanes may be prepared in an equilibration reaction (as described in, e.g. Noll, "Chemie und Technologie der Silicone" [Chemistry and Technology of Silicons], Wiley/VCH Weinheim 1984), which can be converted into the modifier reagent employed according to the invention in further steps. Within the context of the present invention the number of Si—H groups in the Si—H-functional polydimethylsiloxane must be at least two (at least one Si—H group for attachment of the anchor group $(R^1_x R^2_{3-x} SiR^3)_y$, and at least one Si—H group for attachment of the polar modification are necessary).

Unsaturated compounds such as, for example, 1-octene, 1-decene, 1-dodecene, 1-hexadecene and 1-octadecene, can be attached to polysiloxanes having Si—H groups by known methods using suitable catalysts such as, for example, hexachloroplatinic acid, Speyer's catalyst, platinum divinyltetramethyldisiloxane complex or in the presence of platinum compounds attached to supports; the hydrosilylation conditions are generally known, the hydrosilylation temperature lies preferably between room temperature and 200° C., preferably between 50 and 150° C., depending on the catalyst employed.

In analogy to the attachment of alkenes other compounds with unsaturated groups can alternatively be added to Si—H groups within the sense of a hydrosilylation. For example, polyalkyleneglycol allylalkyl ether (e.g. polyglycol AM types, Clariant GmbH) or trialkoxyvinylsilane (e.g. Dynasylan VTMO or Dynasylan VTEO, Degussa AG) can be added to Si—H groups.

Also addition compounds of lactones such as, for example, ε-caprolactone and or δ-valerolactone, to ethylenic unsaturated alcohols such as, for example, allyl alcohol, hexenol, allyl glycol or vinylhydroxybutyl ether, can be added to Si—H groups. For example, these compounds can be alkylated or acylated.

In addition to the possibility of the addition of ethylenic unsaturated compounds to Si—H groups there is also the possibility to couple hydroxyl-functional compounds to Si—H functional polydimethylsiloxanes in a condensation reaction. For example, polyalkyleneglycol monoalkyl ethers (e.g. butylpolyethyleneglycol) can be condensed with Si—H groups with cleavage of hydrogen gas in this known process. For example, zinc acetylacetonate can be employed as catalyst in this reaction. In an analogous manner other substituents can also be inserted into the polydimethylsiloxane, for example groups having ester groups.

Hydrosilylation and condensation reactions can also be carried out to modify Si—H-functional polydimethylsiloxanes. It is also possible for a combined method to be used to prepare the modifier.

In contrast to hydrosilylation (formation of an Si—C bond) an Si—O linkage is formed in the condensation reaction.

In this way the radical $R^4$ can be modified through the polar groups (G) as listed, for example, under (i) to (iv) of claim 1.

The particles of the invention, in particular nanoparticles, can be used, for example, directly in coatings and plastics. The particles of the invention, in particular nanoparticles, are however especially suitable for the preparation of dispersions, e.g. in water, solvents, plasticizers, waxes, mineral oils and reactive diluents and other carrier media commonly employed in the coating and plastics industry.

The preparation of the dispersion of the invention is carried out by the incorporation of correspondingly modified particles into the desired dispersion medium or carrier or dispersant using customary dispersing equipment such as tooth colloid mills, dissolvers, ultrasound dispersers, etc.

By adding the modifier to a particle dispersion, in particular nanoparticle dispersion, a dispersion of the invention is obtained. In this process too it must be ensured that a chemical, in particular covalent, coupling of the modifier to the particle surface, in particular nanoparticle surface, takes place. The conversion of a dispersion of the invention from one dispersion into another dispersion medium is achieved, for example, by distillation. Such methods are easy to optimize by the use of suitable entrainers that form a low-boiling azeotrope with the dispersing agent to be removed.

The particle content of the dispersions of the invention, measured as ignition residue, can in this way be increased to over 40% without gel formation or significant sedimentation.

The dispersions of the invention can comprise at least one additional substance coming from the area of typical coating additives, binders or cross-linking agents. Mentioned here by way of example are wetting and dispersion additives and additives for controlling the rheological properties, but also defoamers, light stabilizers and catalysts.

The particles of the invention, in particular nanoparticles, and the dispersions of the invention are utilizable extremely broadly. The broad applicability in combination with the extraordinarily high activity of the particles of the invention, in particular nanoparticles and the dispersions of the invention, exceed particles, in particular nanoparticles, and dispersion of the prior art by a wide margin.

The particles of the invention, in particular nanoparticles, and dispersions are employed by addition to existing systems that are further processed, for example, to coating materials, adhesives, plastics, etc. The addition of even small amounts of the particles of the invention, in particular nanoparticles and the dispersions of the invention produce an extraordinarily increased mechanical stability with concomitant increased resistance towards chemical influences of the coating and molding ultimately achieved.

Surprisingly the processing properties of the coating and plastics are affected insignificantly so no re-optimization of the external parameters are needed for their use.

The particles of the invention, in particular nanoparticles, and their dispersions are outstandingly suitable for use in coating materials, plastics, adhesives, sealants, etc.

Further embodiments, modifications and variations of the present invention are readily recognizable and realizable for the skilled person on reading the description without him needing to leave the scope of the present invention.

The present invention is illustrated by the following Examples which do not, however, in any way limit the present invention.

EXAMPLES

1. Preparation of Modifiers

Modifiers 1-11

| | Raw material | Manufacturer | 1 | 2 | 3 | 4 | 5 | 6 |
|---|---|---|---|---|---|---|---|---|
| A | Baysilone-Oel MH 15 | GE Bayer | 24.71 | 24.71 | 24.71 | 25.50 | 26.93 | 22.82 |
| B | Dynasylan VTMO | Degussa | 16.73 | 16.73 | 16.73 | 17.26 | 18.23 | 15.45 |
| C | UnioX MUS 15 | NOF Europe | 24.71 | | | 22.32 | | |

-continued

| | | | 7 | 8 | 9 | 10 | 11 |
|---|---|---|---|---|---|---|---|
| C | Unilube MB 40 S | NOF Europe | | 24.71 | | 17.97 | |
| C | Unilube MA 170 T | NOF Europe | | | 24.71 | | 30.46 |
| D | 1-octene | | 33.76 | 33.76 | 33.76 | 34.84 | 36.79 | 31.18 |
| E | Karstedt cat. 0.2% | W. C. Heraeus | 0.08 | 0.08 | 0.08 | 0.08 | 0.08 | 0.08 |

| | Raw material | Manufacturer | 7 | 8 | 9 | 10 | 11 |
|---|---|---|---|---|---|---|---|
| A | MDH29D86M | see comment | 40.21 | 40.21 | 40.20 | 44.52 | 33.26 |
| B | Dynasylan VTMO | Degussa | 6.46 | 6.46 | 6.46 | 7.15 | 5.34 |
| C | Uniox MUS 15 | NOF Europe | 40.21 | | | | |
| C | Unilube MB 40 S | NOF Europe | | 40.21 | | 33.82 | |
| C | Unilube MA 170 T | NOF Europe | | | 40.24 | | 50.54 |
| D | 1-octene | | 13.03 | 13.03 | 13.03 | 14.43 | 10.78 |
| E | Karstedt cat. 0.2% | W. C. Heraeus | 0.08 | 0.08 | 0.08 | 0.08 | 0.08 |

General Preparative Procedure:

(A) is placed in a 250 ml four-necked flask fitted with stirrer, thermometer, reflux condenser and inert gas connection, heated to 80° C. under nitrogen and treated with (E). (B) is then added dropwise within 40 minutes and the reaction mixture is stirred at 120° C. for 30 minutes. (C) is then added dropwise over a period of 20 minutes. After conclusion of the addition the reaction mixture is stirred at 120° C. for a further 30 minutes. Finally (D) is added dropwise over a period of 150 minutes followed by stirring for 60 minutes.

Comment:

The silicone MDH29D86M (see diagram) is prepared simply in an equilibration reaction as described in Noll, "Chemie und Technologie der Silicone" [Chemistry and Technology of Silicons], Wiley/VCH Weinheim, 1984.

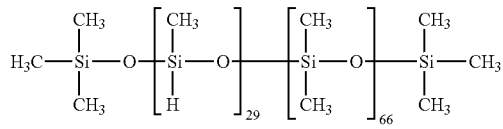

2. Preparation of the Nanoparticle Concentrates

Nanoparticle Concentrates 1-11

| | Product name | Manufacturer | Amount/g |
|---|---|---|---|
| A | Köstrosol 2040AS | CWK-Bad Köstritz | 75.00 |
| B | 1-Methoxy-2-propanol | | 75.00 |
| C | Dynasylan PTMO | Degussa | 1.64 |
| D | Methoxypropyl acetate | | 80.00 |
| E | Dynasylan OCTMO | Degussa | 1.17 |
| F | Modifier (1-11) | | 0.60 |
| G | Disperbyk-168 | BYK-Chemie | 65.00 |

General Preparative Procedure (A) is treated with (B) in a 250 ml four-necked flask fitted with a stirrer, thermometer and reflux condenser, and after heating to 70° C. (C) is added. After a reaction time of 90 minutes (D) is then added. Vacuum is then applied and 100 g of solvent mixture is removed at a temperature of 70° C. (E) and (F) are now added sequentially and stirring is continued at 70° C. for 120 minutes. (G) is finally added. By separation of 60 g solvent mixture under vacuum a nanoparticle content of 21.7% is achieved.

3. Application Examples

Application Examples 1-11

| Two-component automobile repair system | | |
|---|---|---|
| | Comparison sample | Application example 1-11 |
| Component 1 | | |
| Macrynal SM515/70BAC | 46.7 | 46.7 |
| Methoxypropyl acetate | 8.3 | 8.3 |
| Butylglycol acetate | 1.3 | 1.3 |
| TinStab BL277 (1% solution in butyl acetate) | 0.2 | 0.2 |
| Butyl acetate | 10.1 | 10.1 |
| Nanoparticle concentrate 1-11 | — | 5.3 |
| Component 2 | | |
| Desmodur N 3390 | 26.5 | 26.5 |
| Butyl acetate | 6.9 | 6.9 |

Macrynal SM 515/70BAC (hydroxyl-functional polyacrylate): UCB
TinStab BL277 (dibutyltin dilaurate): Akcros Chemicals
Desmodur N 3390 (aliphatic polyisocyanate): Bayer AG The constituents of the respective components were mixed intimately. Immediately before coating the two components 1 and 2 were mixed. The application of the coating system was carried out by spray application onto PMMA plates (200 mm×400 mm) by spray application. After a flash-off period of one hour at room temperature forced drying at 60° C. was carried out for a period of 12 hours. The film thickness of the coating achieved was ca. 45 μm.

The scratch resistance was tested with a Crockmeter apparatus (type CM-5, AT-LAS) for resistance to scratching. For this purpose the coated plates were abraded reproducibly with a polishing cloth of the company 3M (3M polishing paper, grade; 9 mic) (applied force: 9 N). Evaluation of the resistance to scratching was carried out by measurement of the gloss of the abraded site by comparison with a non-abraded site on the test sheet. The result was reported as residual gloss in percent (%). The gloss was determined with the micro-TRI-Gloss apparatus of the company BYK-GARDNER. The observation angle was set at 85°.

The quality of the coating surface, in particular the flow of the coating material was assessed optically using a scale of 1-5. A value of 1 corresponds to a very good flow of the coating, a value of 5 corresponds to a poor coating flow, which reveals itself as an orange skin-like surface.

|  | Residual gloss % | Flow |
|---|---|---|
| Comparison example | 10 | 5 |
| Application example 1 | 81 | 4 |
| Application example 2 | 86 | 2 |
| Application example 3 | 84 | 4 |
| Application example 4 | 75 | 4 |
| Application example 5 | 83 | 2 |
| Application example 6 | 69 | 2 |
| Application example 7 | 80 | 4 |
| Application example 8 | 68 | 4 |
| Application example 9 | 85 | 2 |
| Application example 10 | 67 | 2 |
| Application example 11 | 53 | 2 |

4. Preparation of a Modifier

Modifier 12

100 g Si—H-functional polysiloxane with the following average structure were placed in a 250 ml four-necked flask fitted with heater, internal thermometer, stirrer and protective gas connection:

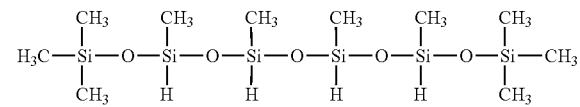

This silicone may be prepared readily in an equilibration reaction as described in Noll "Chemie und Technologie der Silicone" [Chemistry and Technology of Silicons], Wiley/VCH Weinheim, 1984.

The silicone is heated under nitrogen to 70° C. and 10 ppm hexachloroplatinic acid are added. 251 g of a poly(oxyethylene)glycol-a-methyl-o-allyl ether (Uniox PKA-5009, NOF Europe) are then added such that the reaction temperature does not exceed 80° C. 73 g vinyltrimethoxysilane (e.g. Geniosil XL10, Wacker Chemie GmbH) are then added. Care must be taken that the temperature does not exceed 80° C. After addition the reaction mixture is stirred for an hour at 80° C. Vacuum is then applied and ca. 2 g unreacted vinyltrimethoxysilane and readily volatile components of the polysiloxane are distilled off. The product is of low viscosity and has an amber-like coloration.

5. Preparation of the Nanoparticle Concentrate

("Nanoparticle Concentrate 12") and a Corresponding Comparator 40 g nanoscale aluminum oxide are treated with 4 g modifier reagent from the previous preparation example ("Modifier 12") in a kitchen mixer. The mixture is then homogenized for 1 minute. The powder coated with modifier reagent is heated for an hour at 80° C. 40 g of the modified nanoparticle are stirred into a solution of 56.8 g methoxypropyl acetate and 3.2 g wetting and dispersing auxiliary (BYK-9077, BYK-Chemie GmbH) and dispersed with ultrasound. The dispersion thus obtained is of low viscosity and shows no tendency towards gel formation or sedimentation after 28 days storage.

6. Application Example

| UV clear varnish | | | |
|---|---|---|---|
| Components | Zero sample | Comparator | Application example 12 |
| Sartomer SR-368[1] (isocyanurate triacylate) | 27 g | 27 g | 27 g |
| Sartomer SR-494[1] (ethoxylated pentaerythritol tetraacrylate) | 9 g | 9 g | 9 g |
| Sartomer CD-501[1] (trimethylol-propane triacrylate) | 27 g | 27 g | 27 g |
| Sartomer SR-238[1] (1,6-hexanediol diacrylate) | 27 g | 27 g | 27 g |
| Esacure KB1[2] | 5 g | 5 g | 5 g |
| Benzophenone | 5 g | 5 g | 5 g |
| Nanoparticle dispersion 12 | 0 g | 0 g | 2.5 g |
| Modifier 12 | 0 g | 0.1 | 0 g |

[1]Sartomer Company Inc
[2]Lamberti S.p.A. chemical specialties

The individual components of the clear varnish are mixed intimately and stored in a dark place at room temperature for a period of at least 12 hours.

The varnishes were applied to PVC sheets with a 25 μm spiral applicator and then flashed-off for 15 minutes. Curing of the varnishes was carried out in a UV facility. The varnishes were treated twice overall at a belt speed of 5.0 m/min with a radiation intensity of 120 W/cm.

After a storage time of three days the coated PVC sheets were soiled with shoe polish of the brand KIWI (KIWI brown). After 30 and 60 minutes and after 24 hours the shoe polish was removed by hand with a dry cloth and the tested sites evaluated optically.

| Test duration | Zero sample | Comparator (only silicone) | Application example 12 |
|---|---|---|---|
| 30 minutes | slightly soiled | highly soiled | no soiling |
| 60 minutes | highly soiled, varnish is attacked | highly soiled | no soiling |
| 24 hours | very highly soiled, varnish is partly lifted | very highly soiled, varnish is attacked | no soiling |

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. Surface-modified inorganic-based nanoparticles, wherein the nanoparticles comprise reactive groups on their surface, wherein the nanoparticles have been reacted with the polysiloxane-based modifier on their surface under the formation of covalent chemical bonds, wherein:
the modifier is a polysiloxane with the following general formula $$(R^1_x R^2_{3-x} SiR^3)_y R^4$$

whereby in the general formula:
x=0 to 2 including the limits;
y=1 to 10 including the limits;
$R^1$=a monovalent organic radical having 1 to 18 carbon atoms;
$R^2$=OH group or hydrolysable group comprising or consisting of:
  a linear or branched or cyclic alkoxy group having 1 to 6 carbon atoms,
  a halogen atom, or
  a carboxylic acid radical having 1 to 4 carbon atoms;
$R^3$=oxygen or an at least divalent organic radical comprising or consisting of:
  a linear or branched alkylene radical having 1 to 8 carbon atoms,
  an alkylene ether,
  an alkylene thioether,
  an alkylene polyether based on ethylene oxide, propylene oxide, butylene oxide or styrene oxide or mixtures of the oxides or based on a statistic or block polyether,
  an arylene polyether,
  an alkylene polyester or
  an organic aliphatic or aromatic or arylaliphatic group;
$R^4$=mono- or polyvalent radical comprising or consisting of a polydialkylsiloxane having 4 to 200 Si units and with $C_1$-$C_{18}$ alkyl groups on the silicon atoms, whereby the $C_1$-$C_{18}$ alkyl groups are partially and in each case independently of one another replaced or substituted by one or more of the following modifying groups (G) selected from the following modifying groups (G1) to (G4) listed under (i) to (iv):
(i). group (G1) containing (poly)ether groups,
(ii) group (G2) containing polyester groups,
(iii) group (G3) containing arylalkyl groups,
(iv) group (G4) containing perfluorinated alkyl groups,
wherein:
the group (G1) containing the (poly) ether groups is based on at least one alkylene oxide of the general formula

wherein the radical R' denotes a hydrogen atom, a phenyl radical or an alkyl radical or is based on a mixture of at least two or these alkylene oxides; and
the group (G1) containing the (poly)ether groups has a molar mass in the range of 116 to 15,000 Dalton; and
the ratio of the mass of the poly(di)alkylsiloxane and the modified group (G1) lies in the range 12:1 to 0.07:1; and
the group (G2) containing the polyester groups is a group containing an aliphatic and/or cycloaliphatic and/or aromatic polyester group or a group containing one of these groups; and the group (G2) containing the polyester groups contains at least three groups

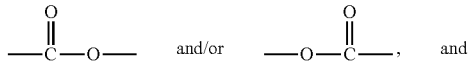

the group (G2) containing the polyester groups has a molar mass in the range of 344 to 4,000 Dalton; and
the ratio of the mass of the poly(di)alkylsiloxane and the modified group (G2) lies in the range of 1:5 to 1:0.05; and
the group (G3) containing the arylalkyl groups is a phenylpropyl group or a group containing this group; and
the group (G4) containing the perfluorinated alkyl group is a perfluorinated alkyl group having 3 to 8 carbon atoms or a group containing this group.

2. The surface-modified particles according to claim 1, wherein the group (G4) containing the perfluorinated alkyl group is a tetrahydroperfluoroalkyl group.

3. The surface-modified particles according to claim 1, wherein the fraction of the modifier is 0.01 to 50% by weight relative to the total weight of the surface-modified particles.

4. The surface-modified particles according to claim 1, wherein the particles are inorganic-based particles with at least one of silane-reactive and siloxane-reactive groups on their surface.

5. The surface-modified particles according to claim 4, wherein the silane-reactive and siloxane-reactive groups are selected from the group consisting of hydroxyl groups, halogen atoms and groups containing halogen atoms.

6. The surface-modified particles according to claim 1, wherein the particles comprise or consist of at least one oxide, hydroxide or oxide hydroxide of at least one metal or semimetal or mixtures or combinations of such compounds.

7. The surface-modified particles according to claim 6, wherein the particles comprise or consist of at least one oxide, hydroxide or oxide hydroxide of aluminum, silicon, zinc or titanium.

8. The surface-modified particles according to claim 1, wherein the particles have particle sizes in the range of 1 to 350 nm.

9. The surface-modified particles according to claim 1, wherein the particles have particle sizes below 100 nm.

10. The surface-modified particles according to claim 1, wherein the particles are additionally modified with a silane of the general formula $$R^6_{(4-x')} SiR^5_{x'}$$

wherein the general formula:
x'=1 to 3 including the limits;
$R^5$=monovalent linear or branched or cyclic organic radical having 1 to 18 carbon atoms;
$R^6$=hydroxyl group or a hydrolysable group comprising or consisting of:
  a linear or branched or cyclic alkoxy group having 1 to 6 carbon atoms,
  a halogen atom, or
  a carboxylic acid radical having 1 to 4 carbon atoms.

11. The surface-modified particles according to claim 1, wherein the particles are additionally modified with a silane of the general formula $$R^7_{(4-x'')} Si(R^8\text{-}R^9\text{-}R^{10})_{x''}$$

whereby in the general formula:
X''=1 to 3 including the limits;
$R^7$=hydroxyl group or hydrolysable group comprising or consisting of:
  a linear or branched or cyclic alkoxy group having 1 to 6 carbon atoms, a halogen atom, or
a carboxylic acid radical having 1 to 4 carbon atoms;
$R^8$=oxygen or an at least divalent organic radical comprising or consisting of:
  a linear or branched alkylene radical with 1 to 8 carbon atoms,
  an alkylene ether,
  an alkylene thioether,
  an alkylene polyether,
  an arylene polyether,
  an alkylene polyester or
  an organic aliphatic or aromatic or arylaliphatic group;
$R^9$=divalent organic group having a molar mass in the range of 130 to 5,000 Dalton, comprising or consisting of:
  a polyether group,
  an aliphatic and/or cycloaliphatic and/or aromatic polyester group;
$R^{10}$=alkyl group or acetoxy group or a radical —O—$R^{11}$,
whereby $R^{11}$ is an alkyl group having 1 to 18 carbon atoms or a radical —O—CO—NH—$R^{12}$,
whereby R12 is an alkyl group having 1 to 18 carbon atoms.

12. A dispersion, the dispersion comprising:
surface-modified inorganic-based nanoparticles in a dispersant medium,
  wherein the surface-modified inorganic-based nanoparticles comprise reactive groups on their surface,
  wherein the nanoparticles have been reacted with the polysiloxane-based modifier on their surface under the formation of covalent chemical bonds,
  wherein:
the modifier is a polysiloxane with the following general formula

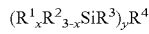

whereby in the general formula:
x=0 to 2 including the limits;
y=1 to 10 including the limits;
$R^1$=a monovalent organic radical having 1 to 18 carbon atoms;
$R^2$=OH group or hydrolysable group comprising or consisting of:
  a linear or branched or cyclic alkoxy group having 1 to 6 carbon atoms,
  a halogen atom, or
  a carboxylic acid radical having 1 to 4 carbon atoms;
$R^3$=oxygen or an at least divalent organic radical comprising or consisting of:
  a linear or branched alkylene radical having 1 to 8 carbon atoms,
  an alkylene ether,
  an alkylene thioether,
  an alkylene polyether based on ethylene oxide, propylene oxide, butylene oxide or
  styrene oxide or mixtures of the oxides or based on a statistic or block polyether,
  an arylene polyether,
  an alkylene polyester or
  an organic aliphatic or aromatic or arylaliphatic group;
$R^4$=mono- or polyvalent radical comprising or consisting of a polydialkylsiloxane having 4 to 200 Si units and with $C_1$-$C_{18}$ alkyl groups on the silicon atoms, whereby the $C_1$-$C_{18}$ alkyl groups are partially and in each case independently of one another replaced or substituted by one or more of the following modifying groups (G) selected from the following modifying groups (G1) to (G4) listed under (i) to (iv):
  (i) group (G1) containing (poly)ether groups;
  (ii) group (G2) containing polyester groups,
  (iii) group (G3) containing arylalkyl groups,
  (iv) group (G4) containing perfluorinated groups,
wherein:
  the group (G1) containing the (poly) ether groups is based on at least one alkylene oxide of the general formula

wherein the radical R' denotes a hydrogen atom, a phenyl radical or an alkyl radical or is based on a mixture of at least two or these alkylene oxides; and
  the group (G1) containing the (poly)ether groups has a molar mass in the range of 116 to 15,000 Dalton; and
  the ratio of the mass of the poly(di)alkylsiloxane and the modified group (G1) lies in the range 12:1 to 0.07:1; and
  the group (G2) containing the polyester groups is a group containing an aliphatic and/or cycloaliphatic and/or aromatic polyester group or a group containing one of these groups; and
  the group (G2) containing the polyester groups contains at least three groups

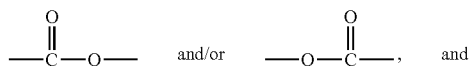

the group (G2) containing the polyester groups has a molar mass in the range of 344 to 4,000 Dalton; and
  the ratio of the mass of the poly(di)alkylsiloxane and the modified group (G2) lies in the range of 1:5 to 1:0.05; and
  the group (G3) containing the arylalkyl groups is a phenylpropyl group or a group containing this group; and
  the group (G4) containing the perfluorinated alkyl group is a perfluorinated alkyl group having 3 to 8 carbon atoms or a group containing this group.

13. The dispersion of claim 12, wherein the dispersion is a coating material or coating system.

14. The dispersion of claim 13, wherein the alkyl dispersion is a paint, a colorant, a plastic, a foam, a cosmetic, a nail varnish, an adhesive or a sealant.

15. A method of using a filler in a coating material or coating system, wherein the surface modified inorganic-based nanoparticles of claim 1 are used as fillers.

16. A method for the preparation of the surface-modified inorganic-based nanoparticles of claim 1, in which method inorganic-based particles with reactive groups on their surface are reacted with the polysiloxane-based modifier under the formation of covalent chemical bonds,
  wherein:
the modifier used is a polysiloxane with the following general formula

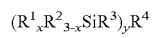

whereby in the general formula:

x 0 to 2 including the limits;

y=1 to 10 including the limits;

$R^1$=a monovalent organic radical having 1 to 18 carbon atoms;

$R^2$=OH group or hydrolysable group comprising or consisting of:
- a linear or branched or cyclic alkoxy group having 1 to 6 carbon atoms,
- a halogen atom, or
- a carboxylic acid radical having 1 to 4 carbon atoms;

$R^3$=oxygen or an at least divalent organic radical comprising or consisting of:
- a linear or branched alkylene radical having 1 to 8 carbon atoms,
- an alkylene ether,
- an alkylene thioether,
- an alkylene polyether based on ethylene oxide, propylene oxide, butylene oxide or styrene oxide or mixtures of the oxides or based on a statistic or block polyether,
- an arylene polyether,
- an alkylene polyester or
- an organic aliphatic or aromatic or arylaliphatic group;

$R^4$=mono- or polyvalent radical comprising or consisting of a polydialkylsiloxane having 4 to 200 Si units and with $C_1$-$C_{18}$ alkyl groups on the silicon atoms, whereby the $C_1$-$C_{18}$ alkyl groups are partially and in each case independently of one another replaced or substituted by one or more of the following modifying groups (G) selected from the following modifying groups (G1) to (G4) listed under (i) to (iv):

(i) group (G1) containing (poly)ether groups,
(ii) group (G2) containing polyester groups,
(iii) group (G3) containing arylalkyl groups,
(iv) group (G4) containing perfluorinated alkyl groups wherein:
the group (G1) containing the (poly) ether groups is based on at least one alkylene oxide of the general formula

wherein the radical R' denotes a hydrogen atom, a phenyl radical or an alkyl radical or is based on a mixture of at least two or these alkylene oxides; and the group (G1) containing the (poly)ether groups has a molar mass in the range of 116 to 15,000 Dalton; and the ratio of the mass of the poly(di)alkylsiloxane and the modified group (G1) lies in the range 12:1 to 0.07:1; and the group (G2) containing the polyester groups is a group containing an aliphatic and/or cycloaliphatic and/or aromatic polyester group or a group containing one of these groups; and the group (G2) containing the polyester groups contains at least three groups

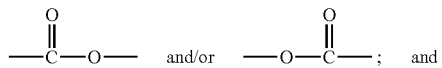

the group (G2) containing the polyester groups has a molar mass in the range of 344 to 4,000 Dalton; and the ratio of the mass of the poly(di)alkylsiloxane and the modified group (G2) lies in the range of 1:5 to 1:0.05; and the group (G3) containing the arylalkyl groups is a phenylpropyl group or a group containing this group; and the group (G4) containing the perfluorinated alkyl group is a perfluorinated alkyl group having 3 to 8 carbon atoms or a group containing this group.

* * * * *